(12) United States Patent
Bortoli et al.

(10) Patent No.: US 11,022,099 B2
(45) Date of Patent: Jun. 1, 2021

(54) RAM AIR TURBINE SHAFT WHIRL DAMPER

(71) Applicant: Hamilton Sundstrand Corporation, Charlotte, NC (US)

(72) Inventors: Stephen Michael Bortoli, Roscoe, IL (US); Daniel Kuehn, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 102 days.

(21) Appl. No.: 16/363,987

(22) Filed: Mar. 25, 2019

(65) Prior Publication Data

US 2020/0309091 A1 Oct. 1, 2020

(51) Int. Cl.
| | | |
|---|---|---|
| *F01D 25/04* | (2006.01) |
| *F03D 7/02* | (2006.01) |
| *F03D 9/25* | (2016.01) |
| *F03D 9/32* | (2016.01) |
| *F03D 80/70* | (2016.01) |
| *B64D 41/00* | (2006.01) |
| *F03D 1/00* | (2006.01) |
| *F03D 1/06* | (2006.01) |
| *F16C 27/04* | (2006.01) |
| *F16C 27/06* | (2006.01) |
| *F16C 35/067* | (2006.01) |

(52) U.S. Cl.
CPC ......... *F03D 7/0296* (2013.01); *B64D 41/007* (2013.01); *F03D 1/00* (2013.01); *F03D 1/0666* (2013.01); *F03D 9/25* (2016.05); *F03D 9/32* (2016.05); *F03D 80/70* (2016.05); *F16C 27/04* (2013.01); *F16C 27/06* (2013.01); *F16C 35/067* (2013.01); *F05B 2220/31* (2013.01); *F05B 2240/932* (2013.01); *F05B 2260/96* (2013.01); *F05B 2260/964* (2013.01)

(58) Field of Classification Search
CPC . F03D 1/0666; F03D 9/25; F03D 9/32; F03D 80/70; F05B 2230/31; F05B 2240/923; F05B 2260/964; F16C 27/04; F16C 27/06; F16C 35/067
See application file for complete search history.

(56) References Cited

U.S. PATENT DOCUMENTS

| 4,952,076 A | 8/1990 | Wiley, III et al. |
| 5,505,587 A | 4/1996 | Ghetzler |
| 2005/0276530 A1 | 12/2005 | Chen et al. |
| 2012/0269616 A1 | 10/2012 | Bortoli et al. |

FOREIGN PATENT DOCUMENTS

| EP | 0712996 A1 | 5/1996 |
| EP | 1975429 A2 | 10/2008 |

OTHER PUBLICATIONS

Extended European Search Report dated Jun. 12, 2020, issued during the prosecution of European Patent Application No. EP 19208897.9.

*Primary Examiner* — Ninh H. Nguyen
(74) *Attorney, Agent, or Firm* — Locke Lord LLP; Scott D. Wofsy; Gabrielle Gelozin

(57) ABSTRACT

A ram air turbine (RAT) can include a housing and a turbine shaft configured to connect to one or more turbine blades and be turned by the one or more blades. The turbine shaft can be disposed in the housing to rotate relative to the housing along a rotational axis. The RAT can include a first bearing and a second bearing mounted between the turbine shaft and the housing to allow the turbine shaft to rotate relative to the housing. The RAT can include a whirl reduction system configured to dampen or eliminate whirl around the rotational axis.

16 Claims, 1 Drawing Sheet

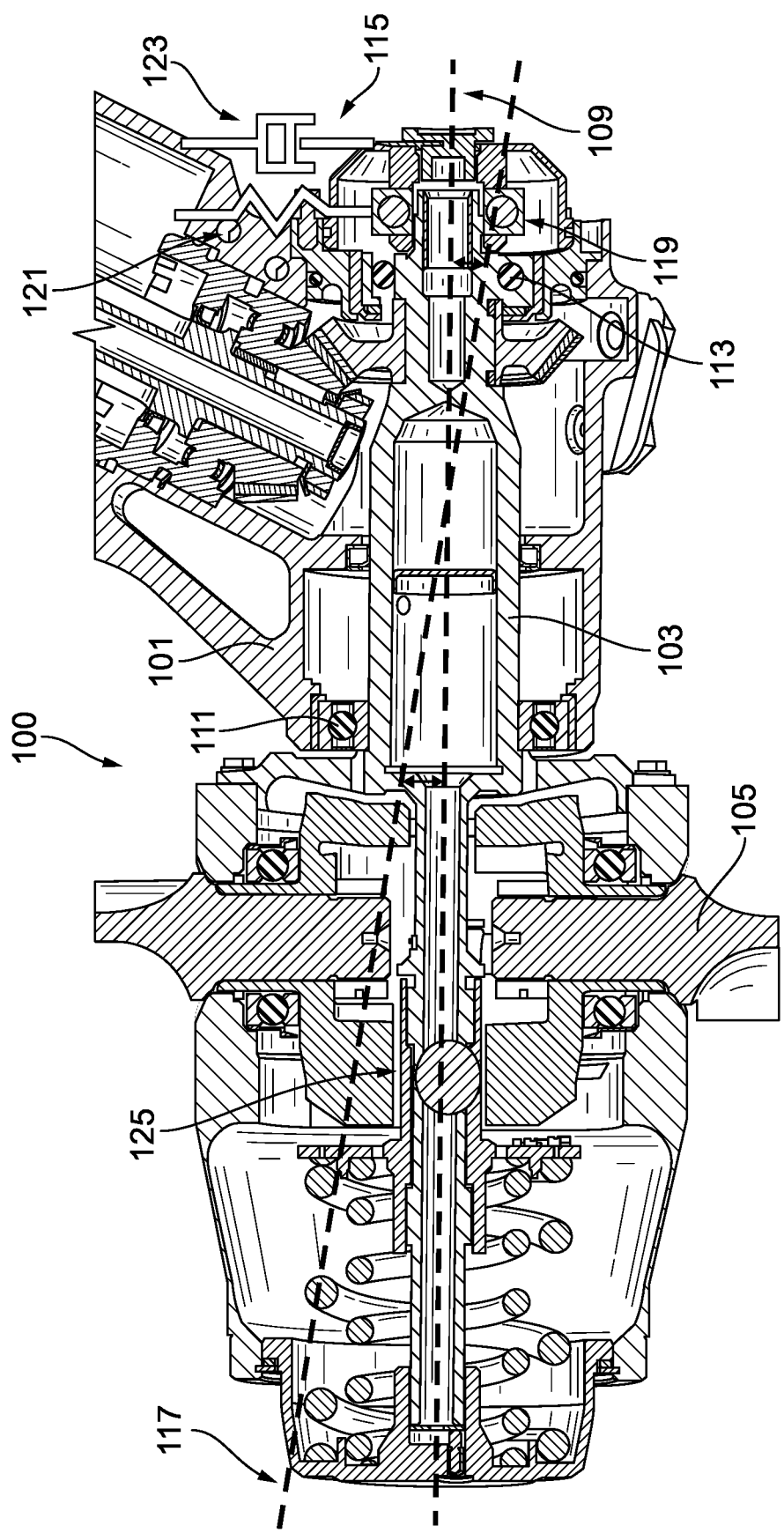

RAM AIR TURBINE SHAFT WHIRL DAMPER

BACKGROUND

1. Field

This disclosure relates to ram air turbine (RAT) systems, more specifically to turbines of RAT systems.

2. Description of Related Art

During ram air turbine (RAT) operation, an unbalanced turbine can force the turbine too whirl through its bearing clearances. This creates a rotation load that the structure must absorb. It also may excite the structures natural frequencies.

Such conventional methods and systems have generally been considered satisfactory for their intended purpose. However, there is still a need in the art for improved RATs. The present disclosure provides a solution for this need.

SUMMARY

A ram air turbine (RAT) can include a housing and a turbine shaft configured to connect to one or more turbine blades and be turned by the one or more blades. The turbine shaft can be disposed in the housing to rotate relative to the housing along a rotational axis. The RAT can include a first bearing and a second bearing mounted between the turbine shaft and the housing to allow the turbine shaft to rotate relative to the housing. The RAT can include a whirl reduction system configured to dampen or eliminate whirl around the rotational axis.

The whirl reduction system can include a third bearing between the housing and the turbine shaft. The whirl reduction system can include a spring connected to the third bearing and to the housing to provide a spring force to the turbine shaft to bias the turbine shaft toward a whirl extent, e.g., to limit whirl.

The whirl reduction system can include a damper connected to the third bearing and the housing. In certain embodiments, the damper can be connected to the third bearing and the housing with the spring.

The third bearing can be positioned aft of both of the first bearing and the second bearing. Any other suitable position is contemplated herein. Any other suitable location, e.g., anywhere along the turbine axis, is contemplated herein.

A center of gravity of the RAT can be forward of both of the first bearing and the second bearing. Any other suitable position for the center of gravity of the RAT is contemplated herein.

In accordance with at least one aspect of this disclosure, an aircraft can include any suitable ram air turbine (RAT) disclosed herein (e.g., as described above). Any other suitable RAT for an aircraft is contemplated herein.

In accordance with at least one aspect of this disclosure, a method for reducing whirl of a ram air turbine (RAT) can include providing a spring force and/or damping between a turbine shaft and housing to dampen and/or eliminate whirl of the RAT. Providing a spring force and/or damping can include providing both a spring force and damping. Providing a spring force can include providing a sufficient spring force to maintain a whirl extent under all loading conditions in flight. Damping the whirl can include reducing a whirl extent. Reducing a whirl extent can include changing a whirl orbit shape about a rotational axis.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a cross-sectional schematic view of an embodiment of a ram air turbine (RAT) in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a ram air turbine (RAT) in accordance with the disclosure is shown in FIG. 1 and is designated generally by reference character 100. Certain embodiments described herein can be used to reduce or eliminate RAT whirl.

A ram air turbine (RAT) 100 can include a housing 101 and a turbine shaft 103 configured to connect to one or more turbine blades 105 and be turned by the one or more blades 105. The turbine shaft 103 can be disposed in the housing 101 to rotate relative to the housing 101 along a rotational axis 109. The RAT turbine 100 can include a first bearing 111 and a second bearing 113 mounted between the turbine shaft 103 and the housing 101 to allow the turbine shaft 103 to rotate relative to the housing 101. The RAT turbine 100 can include a whirl reduction system 115 configured to dampen or eliminate whirl (e.g., orbiting around axis 109 up to whirl extent 117) around the rotational axis 109.

The whirl reduction system 115 can include a third bearing 119 between the housing 101 and the turbine shaft 103. The whirl reduction system 115 can include a spring 121 connected to the third bearing 119 and to the housing 101 to provide a spring force to the turbine shaft 103 to bias the turbine shaft 103 toward a whirl extent 117, e.g., to limit whirl. The spring 121 can be selected to provide any suitable force (e.g., enough to hold the turbine shaft 103 in the whirl extent under all loading conditions to eliminate whirl).

In certain embodiments, the whirl reduction system 115 can include a damper 123, e.g., connected to the third bearing 119 and the housing 101 to provide damping to the turbine shaft 103. In certain embodiments, the damper 123 can be connected to the third bearing 119 and the housing 101 with the spring 121. It is contemplated that the damper 123 can be in any other suitable location (e.g., a separate bearing), and/or can be used without a spring 121.

In certain embodiments, the third bearing 119 can be positioned aft of both of the first bearing 111 and the second bearing 113, e.g., as shown (e.g., at the end of shaft to provide maximum moment arm to reduce the size of the spring 121 and/or damper 123). Any other suitable position (e.g., forward of both first and second bearings 111, 113), e.g., anywhere along the turbine axis, is contemplated herein. In certain embodiments, a third bearing 119 (e.g., placed at a middle point between the first and second bearings 111, 113) can be used alone without a spring 121 or damper 123, for example.

A center of gravity 125 of the RAT turbine 100 can be forward of both of the first bearing 111 and the second bearing 119. Any other suitable position for the center of gravity 125 of the RAT turbine 100 is contemplated herein.

In accordance with at least one aspect of this disclosure, an aircraft can include any suitable ram air turbine (RAT) (e.g., RAT turbine 100) disclosed herein (e.g., as described above). Any other suitable RAT for an aircraft is contemplated herein.

In accordance with at least one aspect of this disclosure, a method for reducing whirl of a ram air turbine (RAT) can include providing a spring force and/or damping between a turbine shaft and housing to dampen and/or eliminate whirl of the RAT. Providing a spring force and/or damping can include providing both a spring force and damping. Providing a spring force can include providing a sufficient spring force to maintain a whirl extent under all loading conditions in flight. Damping the whirl can include reducing a whirl extent. Reducing a whirl extent can include changing a whirl orbit shape about a rotational axis.

In traditional RAT designs, the turbine driveshaft rides on two ball bearings. Each ball bearing has radial clearance, due to internal radial clearance, bearing to driveshaft clearance, bearing to liner clearance, etc. This causes the turbine cg (center of gravity) to whirl as it spins. The whirling of the turbine cg creates a rotating load at each of the bearings which is seen by the RAT structure as an oscillating load which can excite natural frequencies in the RAT creating high loads that the RAT structure and the aircraft must survive and can contribute to driveline torque ripple which can be damaging to the RAT.

Embodiments disclosed herein can include a third bearing added to the turbine driveshaft which mounts to the RAT structure with tuned stiffness and damping characteristics to reduce or eliminate the amount of whirl of the driveshaft. Reducing any rotating load can reduce engineering analysis time, test time, test failures, and result in a lower weight RAT. Certain embodiments can reduce the whirl by restricting radial movement of the shaft. For example, if a third bearing is in the middle if the two existing bearings, this will prevent the shaft from bending. If the third bearing is placed next to either of the bearings, the third bearing, and whichever bearing it is placed next to, will be able to react a moment thereby reducing the potential for the shaft to deflect. Additionally or alternatively, a damper and/or spring can be added to reduce the rotating load due to any remaining whirl.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A ram air turbine (RAT), comprising:
    a housing;
    a turbine shaft configured to connect to one or more turbine blades and be turned by the one or more blades, the turbine shaft disposed in the housing to rotate relative to the housing along a rotational axis;
    a first bearing and a second bearing mounted between the turbine shaft and the housing to allow the turbine shaft to rotate relative to the housing; and
    a whirl reduction system configured to dampen or eliminate whirl around the rotational axis, wherein the whirl reduction system includes:
        a third bearing between the housing the turbine shaft; and
        a spring connected to the third bearing and to the housing to provide a spring force to the turbine shaft to bias the turbine shaft toward a whirl extent, wherein the whirl extent is a line that passes through a center axis and is coplanar with the center axis.

2. The RAT of claim 1, wherein the whirl reduction system includes damper connected to the third bearing and the housing.

3. The RAT of claim 1, wherein the whirl reduction system includes damper connected to the third bearing and the housing with the spring.

4. The RAT of claim 1, wherein the third bearing is aft of both of the first bearing and the second bearing.

5. The RAT of claim 4, wherein a center of gravity of the RAT is forward of both of the first bearing and the second bearing.

6. The RAT of claim 1, wherein the spring force includes a sufficient spring force to maintain a whirl extent under all loading conditions in flight.

7. An aircraft, comprising:
    a ram air turbine (RAT) comprising:
        a housing;
        a turbine shaft configured to connect to one or more turbine blades and be turned by the one or more blades, the turbine shaft disposed in the housing to rotate relative to the housing along a rotational axis;
        a first bearing and a second bearing mounted between the turbine shaft and the housing to allow the turbine shaft to rotate relative to the housing; and
        a whirl reduction system configured to dampen or eliminate whirl around the rotational axis, wherein the whirl reduction system includes:
            a third bearing between the housing the turbine shaft, and
            a spring connected to the third bearing and to the housing to provide a spring force to the turbine shaft to bias the turbine shaft toward a whirl extent, wherein the whirl extent is a line that passes through a center axis and is coplanar with the center axis.

8. The aircraft of claim 7, wherein the whirl reduction system includes damper connected to the third bearing and the housing.

9. The aircraft of claim 7, wherein the whirl reduction system includes damper connected to the third bearing and the housing with the spring.

10. The aircraft of claim 7, wherein the third bearing is aft of both of the first bearing and the second bearing.

11. The aircraft of claim 10, wherein a center of gravity of the RAT is forward of both of the first bearing and the second bearing.

12. The aircraft of claim 7, wherein the spring force includes a sufficient spring force to maintain a whirl extent under all loading conditions in flight.

13. A method for reducing whirl of a ram air turbine (RAT), comprising:
   providing a spring force and/or damping between a turbine shaft and housing to dampen and/or eliminate whirl of the RAT, wherein providing a spring force includes providing a sufficient spring force to maintain a whirl extent under all loading conditions in flight.

14. The method of claim 13, wherein providing a spring force and/or damping includes providing both a spring force and damping.

15. The method of claim 14, wherein damping the whirl includes reducing a whirl extent.

16. The method of claim 15, wherein reducing a whirl extent includes changing a whirl orbit shape about a rotational axis.

* * * * *